US011954175B2

(12) United States Patent
Chen et al.

(10) Patent No.: US 11,954,175 B2
(45) Date of Patent: Apr. 9, 2024

(54) FEATURE PYRAMIDS FOR OBJECT DETECTION

(71) Applicant: CARNEGIE MELLON UNIVERSITY, Pittsburgh, PA (US)

(72) Inventors: Fangyi Chen, Pittsburgh, PA (US); Chenchen Zhu, Pittsburgh, PA (US); Zhiqiang Shen, Pittsburgh, PA (US); Han Zhang, Pittsburgh, PA (US); Marios Savvides, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 443 days.

(21) Appl. No.: 17/386,879

(22) Filed: Jul. 28, 2021

(65) Prior Publication Data

US 2022/0044073 A1 Feb. 10, 2022

Related U.S. Application Data

(60) Provisional application No. 63/062,524, filed on Aug. 7, 2020.

(51) Int. Cl.
*G06F 18/214* (2023.01)
*G06F 18/213* (2023.01)
*G06F 18/2431* (2023.01)
*G06N 5/04* (2023.01)
*G06N 20/00* (2019.01)

(52) U.S. Cl.
CPC ........ *G06F 18/2148* (2023.01); *G06F 18/213* (2023.01); *G06F 18/2431* (2023.01); *G06N 5/04* (2013.01); *G06N 20/00* (2019.01)

(58) Field of Classification Search
CPC .......... G06T 7/11; G06T 7/143; G06T 7/174; G06V 30/194; G06V 10/454; G06F 18/295
See application file for complete search history.

(56) References Cited

U.S. PATENT DOCUMENTS

| | | | | |
|---|---|---|---|---|
| 6,640,145 | B2 * | 10/2003 | Hoffberg | G06F 18/00 709/200 |
| 7,813,833 | B2 * | 10/2010 | McNairy | G07B 17/00661 209/584 |
| 8,175,412 | B2 * | 5/2012 | Basri | G06T 7/593 382/175 |
| 8,768,104 | B2 * | 7/2014 | Moses | G06F 9/5072 382/284 |
| 9,495,607 | B2 * | 11/2016 | Tombari | G06V 10/46 |
| 9,846,821 | B2 * | 12/2017 | Li | G06F 18/00 |

OTHER PUBLICATIONS

Lin et al., "Feature Pyramid Networks for Object Detection", Proceedings of the IEEE Conference on Computer Vision and Pattern Recognition (CVPR), 2017, 10 pages.

* cited by examiner

*Primary Examiner* — Yosef Kassa
(74) *Attorney, Agent, or Firm* — KDW Firm PLLC

(57) ABSTRACT

Disclosed herein is an improvement to prior art feature pyramids for general object detection that inserts a simple norm calibration (NC) operation between the feature pyramids and detection head to alleviate and balance the norm bias caused by feature pyramid network (FPN) and which leverages an enhanced multi-feature selective strategy (MS) during training to assign the ground-truth to one or more levels of the feature pyramid.

21 Claims, 5 Drawing Sheets
(5 of 5 Drawing Sheet(s) Filed in Color)

FEATURE PYRAMIDS FOR OBJECT DETECTION

RELATED APPLICATIONS

This application claims the benefit of U.S. Provisional Patent Application No. 63/062,524, filed Aug. 7, 2020, the contents of which are incorporated herein in their entirety.

BACKGROUND

Generic object detection is one of the most popular and fastest-moving areas within computer vision. With the rise of deep learning, a large body of object detection approaches gave been proposed and have pushed the task to a satisfactory level in many real-world applications, such as surveillance, autonomous driving, etc. Generally, the most widely-used detectors rely heavily on anchor-based region proposals. While some detectors may not require the region proposal as candidates for further processing, they still need a pre-defined anchor to guide achieve a satisfactory convergence of the network.

Recently, some methods have provided a new perspective, where the detection task is reformulated as a key-point-based classification and regression problem through a fully convolutional network (FCN) and directly predicts bounding boxes and object class confidences across all locations. These approaches avoid the use of anchors (i.e., they are anchor-free), and, as a result, they overcome some drawbacks of these networks when detecting small objects and also improve the efficiency of model training.

Current anchor-free detectors do, however, have some disadvantages. The structure of a conventional feature pyramid tends to bias on the training data (i.e. whether scale-based or loss-based), usually only focuses on a limited range of the scales and always selects the same pyramid during training. Furthermore, there is no particular module to handle input variations such as object appearance, illumination, occlusion conditions, etc. (anchor-based detectors also have this issue). However, this is critical for real-world detection tasks. Further, the existing anchor-free designs usually assign ground-truth to only one feature pyramid level (single resolution of feature maps). However, this is incorrect when the size of the object being detected is between two scales of the pyramid, which is a fairly common situation in object detection. Lastly, a single pyramid is not robust enough to detect a variety of discrepant objects because adjacent feature pyramids tend to get confused during training.

SUMMARY OF THE INVENTION

The present invention addresses the previously-discussed problems with prior art feature pyramids to better account for input variations of different objects. Disclosed herein are, first, a norm calibration operation to mitigate object variance on feature spaces for better model generalization, and, second, a multi-feature selection to boost anchor-fee detectors. Images pass through the backbone network and feature pyramid network to generate, in one embodiment, five levels of feature maps with different sizes, followed by a norm calibration layer and a detection head. The multi-feature selection module collects the losses and assigns the ground-truth/ignored areas to the proper level or levels.

The norm calibration operation rescales the norm of each element on the feature map across its channels. That design balances the norm between pyramids so the model can select different feature maps to force the network to converge to a better status and to improve the accuracy, especially for extremely small or large sized objects.

To address the aforementioned ground-truth assignment shortcomings, an adaptive feature selection strategy is introduced to automatically determine which layer or layers are assigned to ground-truth and back-propagate gradients with detection objectives.

Two pyramids are used for training. The additional pyramid provides complementary information. The disclosed method adaptively determines whether the feature pixel corresponding to the second pyramid should be regarded as positive, negative or ignored samples, resulting in a more discriminative representation for anchor-free-based detectors and thereby improving the quality of the detectors.

The norm calibration provides consistent improvement of the accuracy of anchor-based and anchor-free one or two stage detectors. With multi-feature selection, the model improves the accuracy across a variety of popular network architectures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
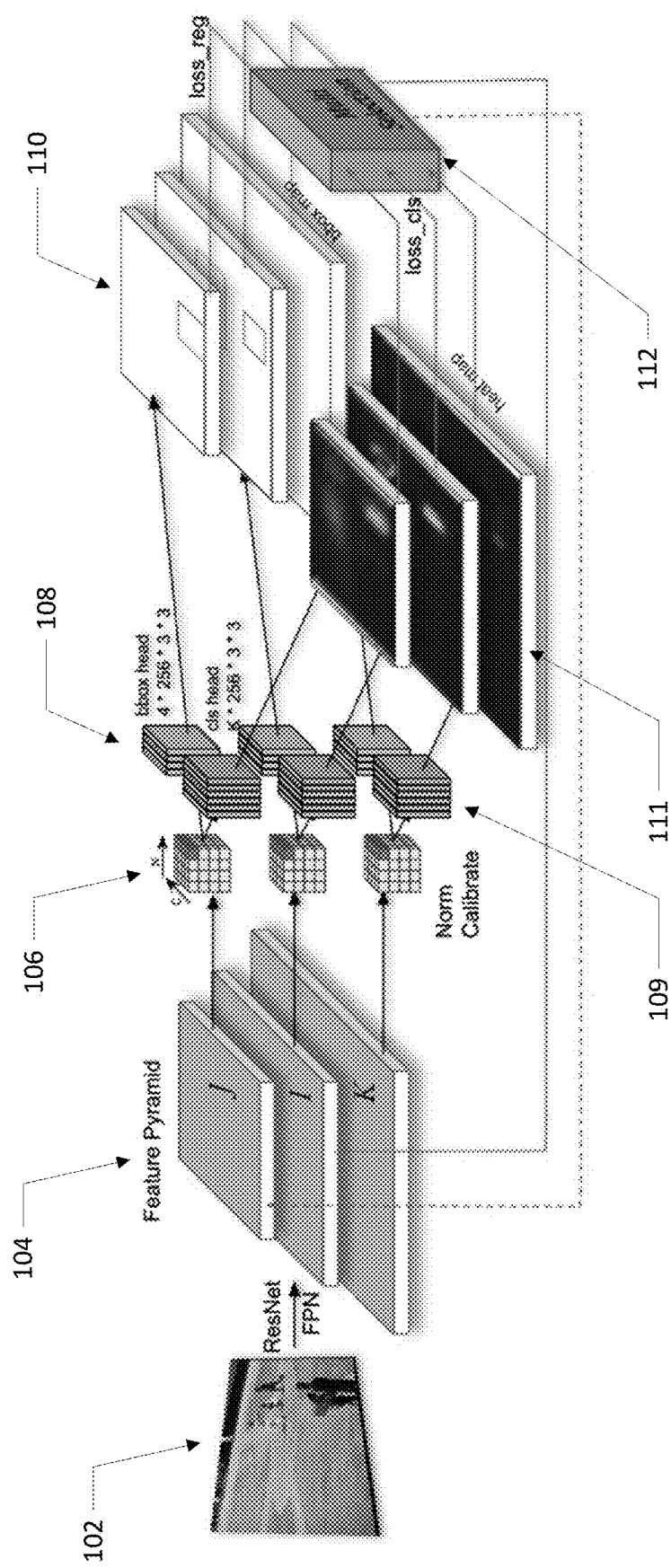
FIG. 1 is a schematic representation of a feature pyramid using the improvements disclosed herein.

The details of the norm calibration, multi-Selection (NCMS) detector will now be discussed. The invention is explained in terms of its application to a prior-art feature-selective anchor-free (FSAF) model, but it is understood that NCMS may be applied to many different prior-art models.

A popular design of prior-art anchor-free detectors apply DenseBox-style detection heads to multiple feature pyramid levels. This general design is adopted by FSAF and several other prior-art models. The Feature Pyramid Network (FPN) utilizes a deep convolutional network as the backbone to generate several levels of feature maps. Generally, the lower level of the feature pyramid has higher resolution and is suited to detect smaller objects while the higher levels have larger receptive fields and are suited to detect larger objects. To introduce strong semantic information from high levels to low levels, the FPN leverages a top-down model which up-samples the high level feature maps and sums them to the adjacent lower levels in an iterative manner.

A detection head is attached to each pyramid level, which contains at least two subnetworks for classification and regression, respectively.

Anchor-free Targets and Losses—The detection head predicts bounding box and class confidence scores for each pixel on the feature maps. Given a ground-truth object (x, y, w, h), where (x, y) indicates the location of the object center and (w, h) indicates the width and height, it is first projected onto the multi-level feature maps. For the $l^{th}$ level, the projected object is calculated as:

$$(x_l, y_l, w_l, h_l) = \left(\frac{x}{2^l}, \frac{y}{2^l}, \frac{w}{2^l}, \frac{h}{2^l}\right) \quad (1)$$

The positive area $(x_{lp}, y_{lp}, w_{lp}, h_{lp})$ on the $l^{th}$ feature map is defined as a shrunk box of the projection:

$$(x_l, y_{lp}, w_{lp}, h_{lp}) = (x_l, y_l, \epsilon_{lp}, w_l, \epsilon_{lp} h_l) \quad (2)$$

where:

$\epsilon_{lp}$ is a positive shrunk factor.

An ignored shrunk factor $\epsilon_{li}$ is usually defined to decide the ignored area on the feature map. The locations inside the ignored area and outside the positive area are ignored for classification optimization. Other areas are negative areas during training. Given a pixel $p_{ij}$ position (i,j) on a feature map, its ground-truth class depends on the area in which it locates. If the pixel locates in a positive area, then its box regression targets ($t_{ij}^t, t_{ij}^n, t_{ij}^l, t_{ij}^r$) are the distances between its position and the top, bottom, left, right boundaries of the projected object $(x_l, y_l, w_l, h_l)$. The focal loss and the IOU loss are the popular losses to optimize the classification and regression subnetworks respectively.

Feature Selective Anchor-Free (FSAF) Module—FSAF utilize the typical prior art DenseBox style detection head applied on an FPN architecture and the anchor-free target and losses are as previously described. Instead of heuristically ruling the matching objects and feature pyramid levels based on the object scale, FSAF first attempts assigning the object to all levels of the feature pyramid and calculating the sum of classification and regression losses for each level, then the level which returns the minimum loss is assigned to the corresponding object to train. This loss-based assignment strategy results in higher accuracy than the ad hoc scale-based strategy.

While prior-art anchor-free detectors have the potential to out-perform the anchor-based counterparts, they tend to overlook the issues of feature bias and feature selection introduced by the feature pyramid networks. The sum operation introduced by the top-down module of FPN usually causes the norms of each feature pixel on a lower level pyramid larger than the those on a higher level. The average norm value of the lowest feature map level can be twice as large than the highest level, regardless of the input image, and two adjacent feature maps usually have similar norm values. This causes the FPN to tend to bias on certain pyramid levels and makes the integrated features focus more on the adjacent resolution but less on others. Also, without the constrains of anchor matching, each instance can be flexibly assigned to an arbitrary feature level during training. Selecting the optimal level or levels is a non-trivial problem.

The disclosed invention upgrades the architecture of FSAF and has three parts, as shown in FIG. 1. The first part is a regular feature pyramid network 104. The feature pyramid 104, in one embodiment, consists of five levels of feature maps (note that only three levels (J, I, K) are shown in FIG. 1 for simplicity) ranging from P3 to P7. For the $l^{th}$ level, the feature map size is $\frac{1}{2^l}$ of the input image 102. The second part is a novel norm calibration layer 106 generating a new norm calibrated feature pyramid which has the same shape as the original feature pyramid. The third part is a detection head consisting of only two subnetworks: a localization subnetwork 108 which is a 3×3 convolution layer with 4 filters, and a classification subnetwork 109 which is a 3×3 convolution layer with K filters, where K is the number of classes.

Figure 2:
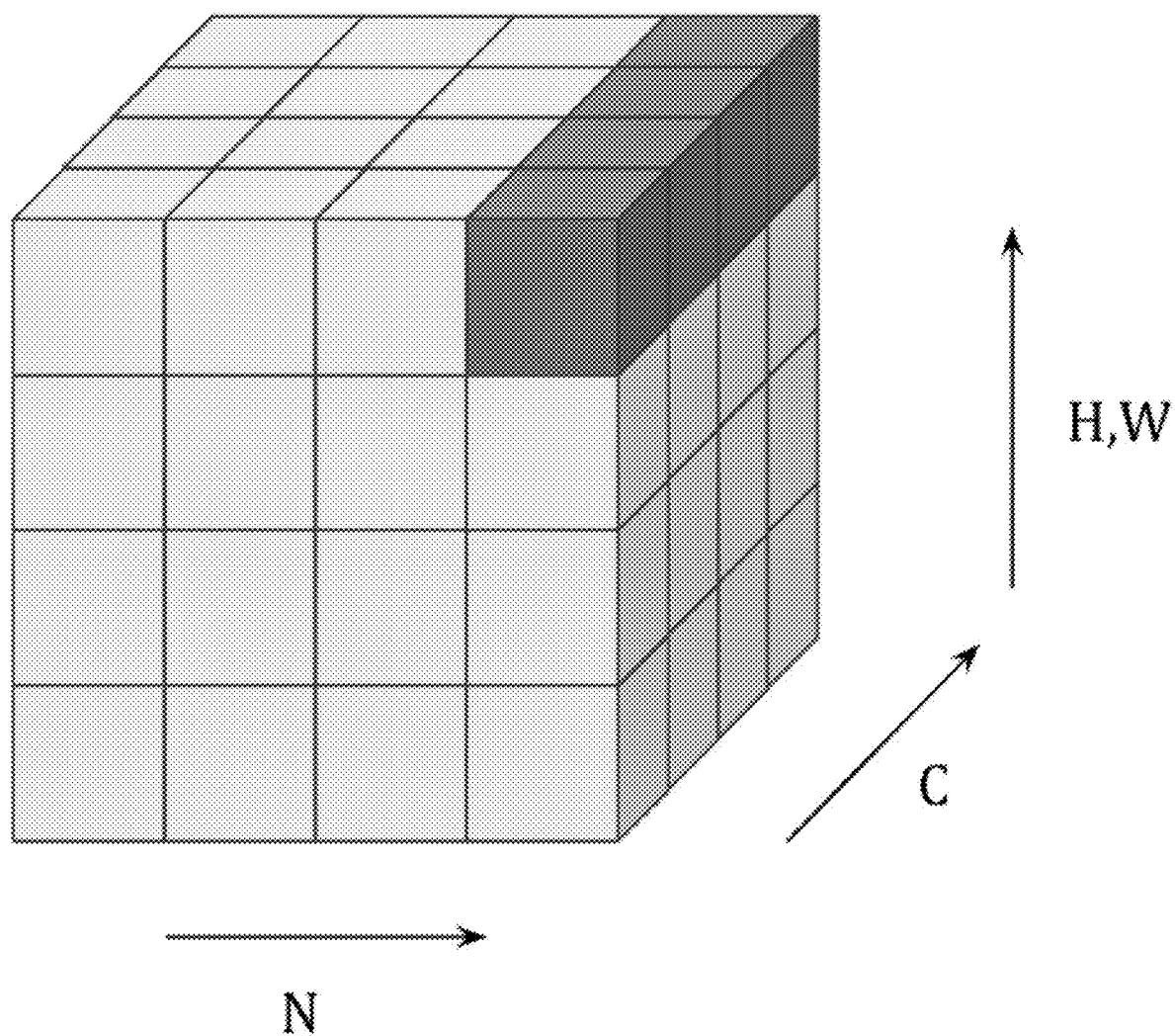
FIG. 2 is a model of the norm calibration, showing the batch axis, the channel axis, and the spatial axis.

Norm Calibration—To address the feature bias issue, the norm calibration is an $l_2$ norm rescaling pattern, as shown in FIG. 2. In the case of N images in one batch, the block with (N, C H, W) axes is shown in FIG. 2, wherein the axes index the features generated by the model, where N is the batch axis, C is the channel axis, and H and W are the height and width axes, respectively. The feature vector is defined as a vector across all channels of a single level feature map. For a feature map with size (C, H, W) there are H·W feature vectors and each feature vector has C channels. For each feature vector $\vec{v}$ on the feature pyramid (five levels), it is divided by its $l_2$ norm and multiplied with a hyper-parameter a to generate a new vector $\vec{v'}$, which is used in the downstream classification and regression subnetworks.

$$\vec{v'} = \frac{\vec{v}}{\|\vec{v}\|} \cdot a \quad (3)$$

The parameter a is used to preserve the strength of gradients, and its value is shared by all feature vectors on the global feature pyramid. The value of a may vary slightly, depending on the model being used. Without loss of generality, the calibration operation can be applied to any FPN-based architecture.

The norm calibration operation 106, inserted between the original feature pyramid 104 and the detection head, eliminates the norm diversity caused by the network, and thus eliminates the feature bias and leads to a more flexible selection for the detection head. The norm calibration operation 106 results in a calibrated feature pyramid (not shown) to which a localization (bbox) head 108 and a classification (cls) head 109 are attached, as shown in FIG. 2. These are used to generate localization map 110 and heat map 111 respectively. The two maps 110, 111 are then used to do classification and regression.

Multi-Feature Selection—Proper feature selection for anchor-free approaches is not a trivial problem. When assigning ground-truth to a feature pyramid, two issues require careful consideration. The first is which level or levels the ground-truth should be assigned to. The second is how to determine the positive/negative/ignored regions for the selected level or levels. Multi-Selection module 112 in FIG. 2 collects the losses and assigns the ground-truth/ignored area to the proper level(s), as described below.

Selecting Levels—Given an object the method attempts to assign it to all five levels of the feature maps and to calculate the per-level losses, as in FSAF. Let $loss_I$, $loss_J$, $loss_K$ be the top 1, 2, 3 minimum losses calculated from levels P3-P7, where I, J, K indicate the levels of the feature maps. The object is always assigned to level I and is always not assigned to level K. An index $\delta$ is defined to indicate whether the level J should be assigned the object, ignored, or negative, wherein:

$$\delta = \frac{loss_J - loss_I}{loss_K - loss_I} \quad (4)$$

If index $\delta$ is smaller than a threshold $\sigma_1$, the ground-truth will also be assigned to level J. If $\delta$ is between the values of $\sigma_1$ and $\sigma_2$, the related area on level J will be ignored. Otherwise, the related area on level J will remain negative.

By the strategy above, if the difference between $loss_J$ and $loss_I$ is small to some extent, the related area on level J will be ignored and the features in the area will not be treated as negative. This avoids pushing the detection head to distinguish similar features. If the difference is significantly smaller than all other levels, the ground-truth will be assigned to level J. This helps the detection head to learn and predict the fit of those objects to both feature maps.

Setting Positive/Ignored on the 2nd Level—For the first selected level I with the minimum loss, the positive area is a shrunk box as described in Eq. (2) with shrunk factor $\in_{Ip}$, and the ignored area is related to the shrunk factor $\in_{Ii}$. In FSAF, $\in_{Ip}=0.2$ and $\in_{Ii}=0.5$. For the second selected level J, the positive and ignored areas are related to the shrunk factors $\in_{Ji}$ and $\in_{Jp}$. The negative area on level J should be larger than the negative area on the level I.

The multi-feature selection aspect of the invention provides a significant improvement over the prior-art FSAF model. There are two reasons for this improvement. First, a ground-truth can be assigned to a second level of the feature map, which not only increases the possibility that a similar object can be detected during inference, but also gives more sufficient features to the detection head for training. Second, compared to FSAF, which always roughly ignores the ground-truth area of the two adjacent levels of the chosen level, NCMS only ignores a smaller area of one adjacent level when $\sigma_1<\delta<\sigma_2$. This provides more hard negative features to make the detection head more robust, and is also the main reason that the number of false-positives is decreased. FSAF ignores the two adjacent levels of the chosen level, and the ignored area on the adjacent levels is the same size as the chosen level. The ignored area is thus too large and will hurt the ability to classify background of the detection head, resulting in false-positives. As such, NCMS model ignores the same size of ignored area on the first chosen level, but only ignores a smaller area on the second chosen level following the selection strategy.

The NCMS model of the disclosed invention provides an anchor-free detector addressing feature bias and smart feature selection on a feature pyramid. A norm calibration layer and an adaptive multi-selection strategy based on the per-level losses are disclosed as the novel features of the invention. Thus, NCMS significantly improves performance as compared to state-of-the-art single-stage models.

Figure 3:
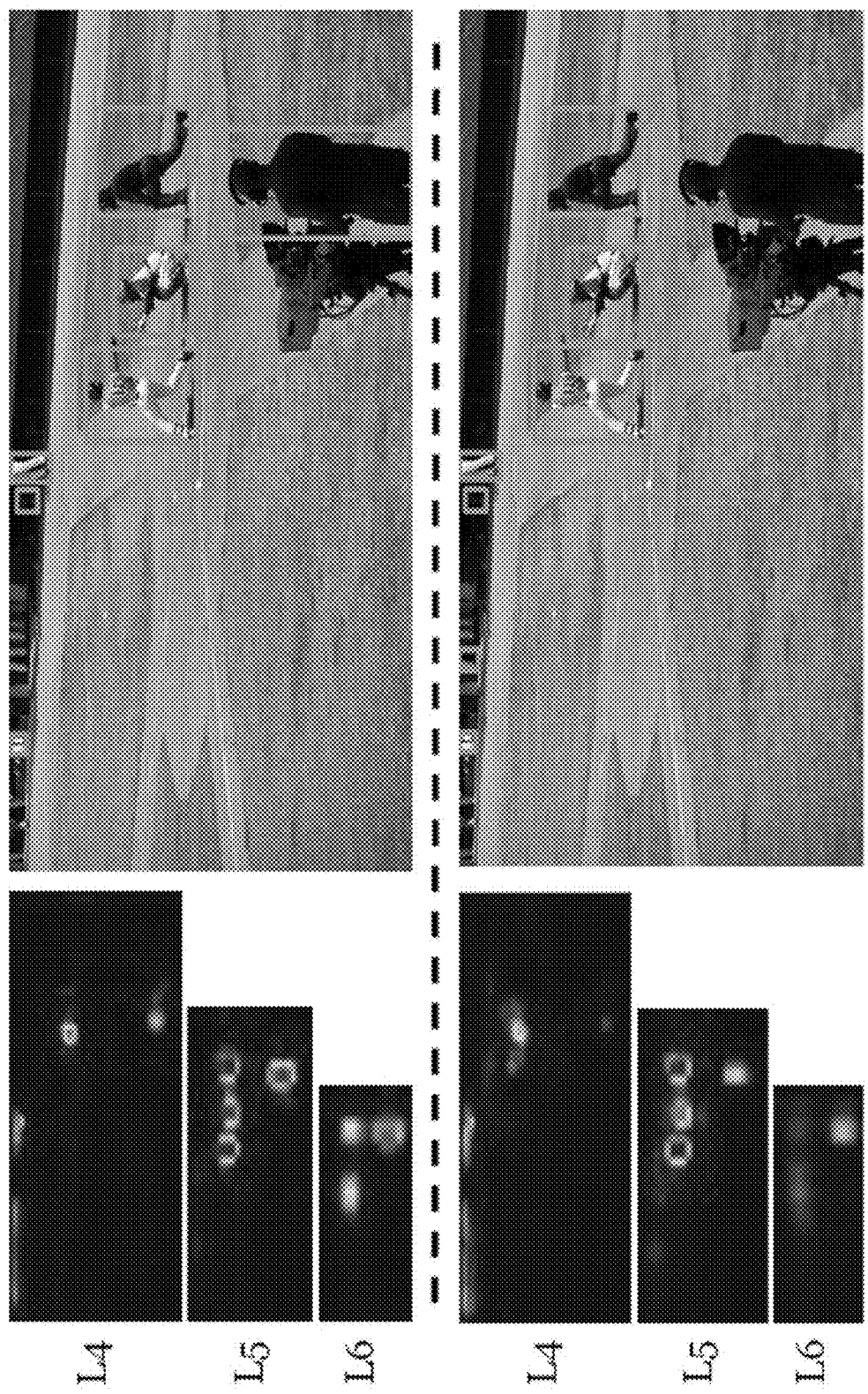
FIG. 3 is a comparison of visualizations of a heat map produce by FSAF and NCMS

FIG. 3 is a visualization of the heatmap of FSAF (bottom) and NCMS (top) showing the advantage of the invention. The cameraman is not detected by FSAF, and the corresponding positions on the heatmaps are not strongly activated on both L5 and L6. This is because that during training FSAF only assigns the cameraman to one single level of feature pyramid (say L6). While the adjacent level (L5) is not assigned and thus trained as negative no matter how similar L5 and L6 are, and this fact in turn weakens the learning of the cameraman and leads to the false negative. With multi-selection the cameraman is detected because, during training, the cameraman can be assigned to two levels of the feature maps, but it can still be observed that the L6 is weakly activated because the norm bias still exists. With NCMS both L5 and L6 are strongly activated and generate accurate predictions where the norm calibration eliminates the norm bias from the feature pyramid.

Figure 4B:
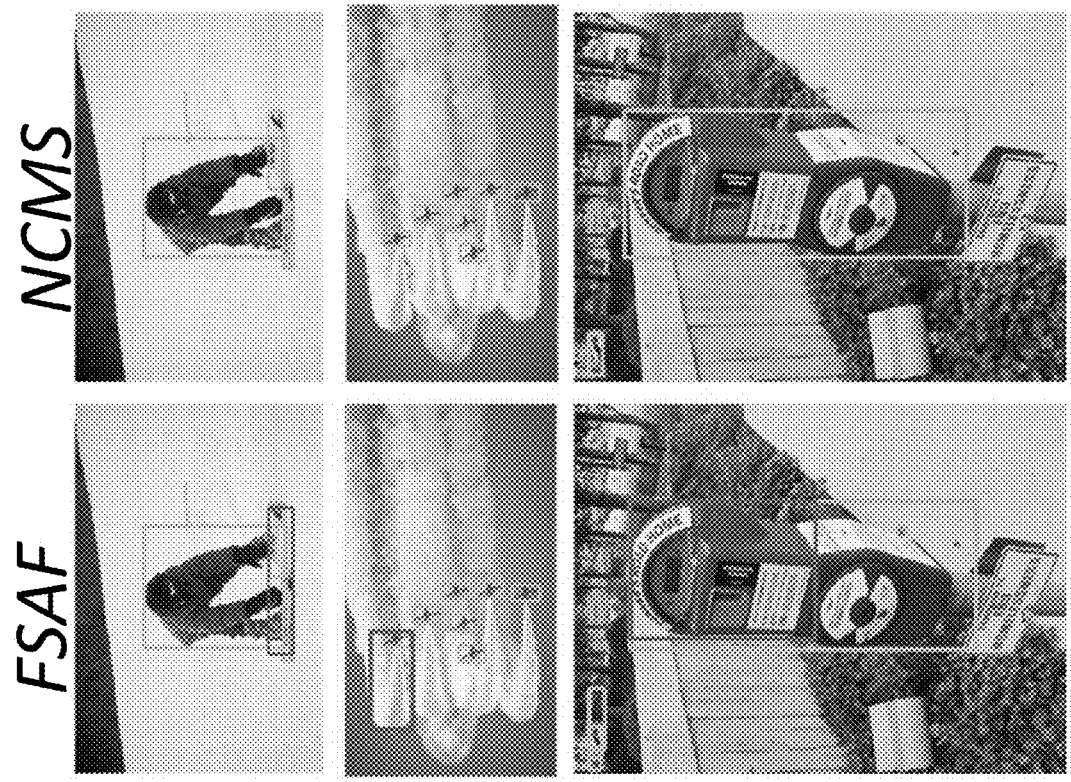
FIGS. 4A-4B are two detection examples comparing FSAF and NCMS.
Figure 4A:

FIGS. 4A, 4B show a comparison of two detections examples comparing FSAF and NCMS. The figures show that NCMS can suppress hard false positives (illustrated as red bounding boxes in the figure) and detect more small objects than FSAF.

Figure 5:
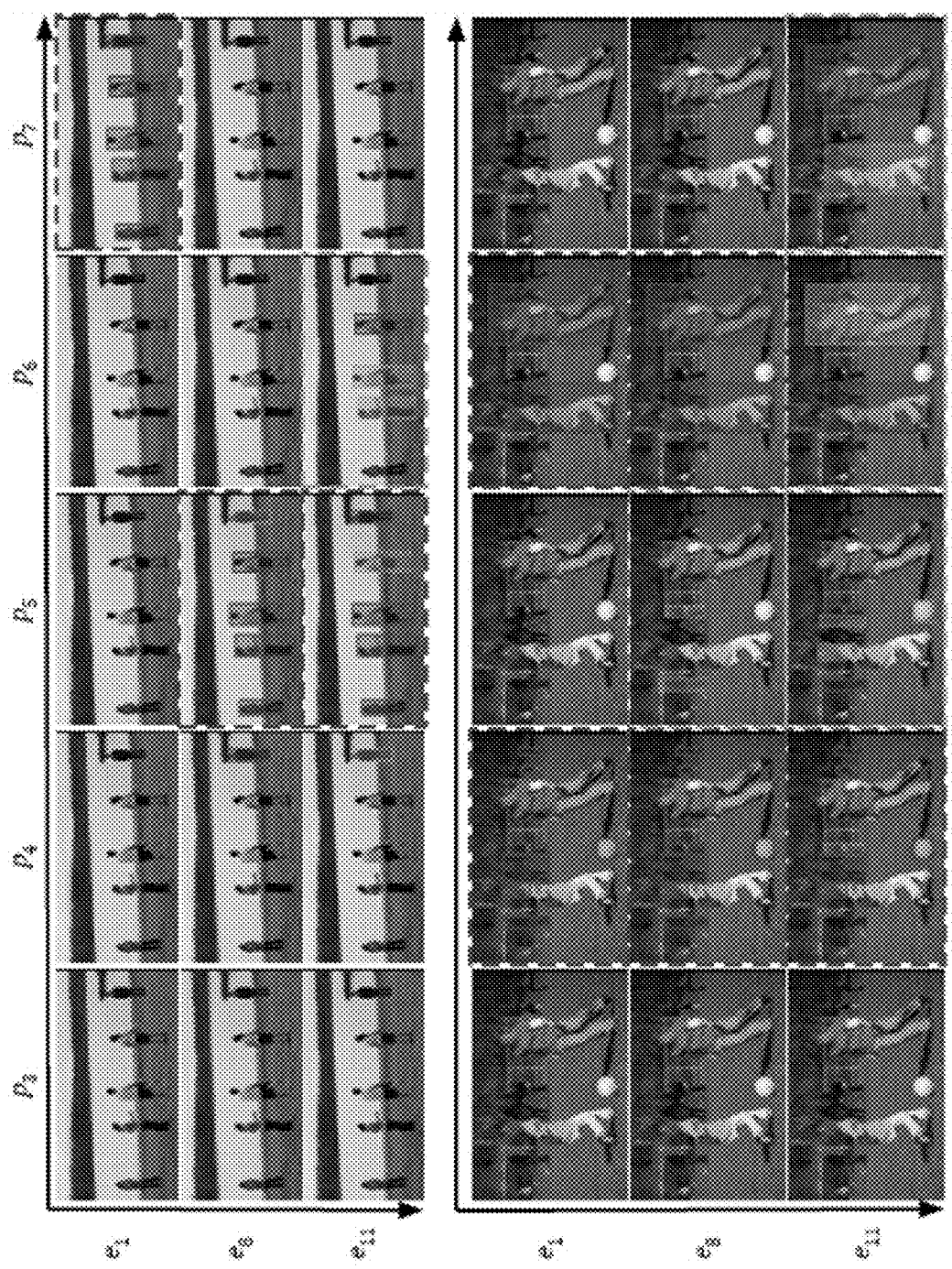
FIG. 5 is a visualization of ground truth assignment at various levels of the feature pyramid.

FIG. 5 shows a visualization of ground-truth assignment. The $P_3$-$P_7$ are the feature maps of feature pyramid, the $e_1$, $e_8$, $e_{11}$ are the number of training epoch. The red mask located at the ($P_I$, $e_i$) means that the related object is assigned to the $P_I$ at the $i^{th}$ training epoch and it is the first selection. The green mask means the object is also assigned to a second level $P_J$.

The invention claimed is:

1. A framework for training an object detector comprising:
    a feature pyramid;
    a norm calibration layer, to generate a norm calibrated feature pyramid from the feature pyramid;
    a localization subnetwork, coupled to the norm calibrated feature pyramid, the localization network generating a multi-level localization map;
    a classification subnetwork, coupled to the norm calibrated feature pyramid, the classification subnetwork generating a multi-level heat map; and
    a multi-selection module for collecting losses from the localization map and the heat map and assigning ground truth and ignored areas to one or more levels of the feature pyramid, based on the collected losses.

2. The framework of claim 1 wherein the feature map has 5 levels, each level from bottom to top being half of the size of a next lowest level.

3. The framework of claim 1 wherein the norm calibrated feature pyramid is identical in size and shape top the feature pyramid.

4. The framework of claim 1 wherein the localization subnetwork is a 3×3 convolution layer having 4 filters.

5. The framework of claim 1 wherein the classification subnetwork is a 3×3 convolution layer having a number of filters corresponding to a number of classification classes.

6. The framework of claim 1 wherein the norm calibration layer is an $l_2$ norm rescaling pattern.

7. The framework of claim 6 wherein the axes of the norm calibration layer indexes features generated by the feature pyramid.

8. The framework of claim 1 wherein the norm calibration layer generates a plurality of feature vectors, each feature vector being a vector across all channels of a single layer of the norm calibrated feature pyramid.

9. The framework of claim 1 wherein an object in an input image is assigned to all levels of the localization and classification maps.

10. The framework of claim 9 wherein a classification and regression loss is calculated for the object for each level of the localization and classification maps.

11. The framework of claim 10 wherein the multi-selector module selects one or more levels of the feature pyramid to assign the object to based on a comparison of the losses for the object at each level of the localization and heat maps.

12. A method for training an object detector comprising:
    deriving a feature pyramid from an input image;
    performing a norm calibration on the feature pyramid to generate a norm calibrated feature pyramid;
    applying one or more subnetworks to the norm calibrated feature pyramid to generate one or more multi-level feature maps, the one or more feature maps having losses for each feature on each level of the feature maps; and selecting one or more levels of the feature pyramid to assign detected objects to based on a comparison of the losses from each level of the one or more feature maps.

13. The method of claim 12 wherein the feature map has 5 levels, each level from bottom to top being half of the size of a next lowest level.

14. The method of claim 12 wherein the norm calibrated feature pyramid is identical in size and shape top the feature pyramid.

15. The method of claim 12 wherein the one or more subnetworks includes a localization subnetwork comprising a 3×3 convolution layer having 4 filters.

16. The method of claim 12 wherein the one or more subnetworks includes a classification subnetwork comprising a 3×3 convolution layer having a number of filters corresponding to a number of classification classes.

17. The method of claim 12 wherein the norm calibration layer is an $l_2$ norm rescaling pattern.

18. The method of claim 17 wherein the axes of the norm calibration layer indexes features generated by the feature pyramid.

19. The method of claim 12 wherein the norm calibration layer generates a plurality of feature vectors, each feature vector being a vector across all channels of a single layer of the norm calibrated feature pyramid.

20. The method of claim 12 wherein an object in an input image is assigned to all levels of the localization and classification maps.

21. The method of claim 20 wherein a classification and regression loss is calculated for the object for each level of the localization and classification maps.

* * * * *